United States Patent Office 2,883,441
Patented Apr. 21, 1959

2,883,441

PURIFICATION OF BENZOLE USING HYDROGEN

Edward William Sawyer, Norton-on-Tees, England, assignor to Imperial Chemical Industries Limited, a corporation of Great Britain No Drawing. Application August 30, 1954
Serial No. 453,132

Claims priority, application Great Britain
September 23, 1953

4 Claims. (Cl. 260—674)

This invention relates to the purification of benzole.

Crude benzoles produced by the carbonization of coal at low and medium temperatures contain appreciable quantities of non-aromatic hydrocarbons. Hydro-refined benzoles i.e. benzoles which have been treated with hydrogen in order to remove sulfur, also contain non-aromatic hydrocarbons. It is known to separate these non-aromatic hydrocarbons from benzole by azeotropic distillation, a process which is costly. It is also known to convert crude benzole into a substantially aromatic product by passing the benzole in the vapor phase over a metal catalyst heated at 600–700° C.

Furthermore, it is known that non-aromatic hydrocarbons can be converted into olefines by pyrolysis. However, when a benzole containing non-aromatic hydrocarbons is heated at high temperatures loss of valuable benzene and its near homologues occurs as well as the desired conversion of non-aromatic hydrocarbons to olefines. This loss is due in part to condensation reactions taking place leading, for example, to the formation of diphenyl.

We have found that by introducing benzoles containing non-aromatic hydrocarbons into a moving bed of inert material under particular conditions of temperature and pressure in the presence of a gas containing free hydrogen, pyrolysis of the non-aromatic hydrocarbons to form volatile olefines, together with partial dealkylation of benzene homologues, without the formation of substantial amounts of condensation products, occurs to give in high yield a benzole substantially free from non-aromatic hydrocarbons. An important advantage of this process is that it produces a benzole substantially free from non-aromatic hydrocarbons without recourse to azeotropic distillation.

According to the present invention therefore, there is provided a process for the production of benzole substantially free from non-aromatic hydrocarbons, in which a benzole containing non-aromatic hydrocarbons is introduced into a moving bed of inert material and there subjected to a temperature within the range 650°–900° C., preferably within the range 750°–850° C., and to about atmospheric or moderately elevated pressure in the presence of hydrogen or a gas containing free hydrogen.

The process may be operated at or about atmospheric pressure or at pressures up to about 10 atmospheres. It is particularly applicable to crude benzoles produced by the carbonization of coal at low and medium temperatures and to hydro-refined benzoles. Compounds containing sulfur may be removed from the benzole before or after subjecting it to the process of the present invention.

The moving bed may be a non-fluidized bed moving under the influence of gravity and comprising coke particles, ceramic pebbles or particles of other suitable inert material of say, $\frac{1}{16}$ inch to $\frac{3}{4}$ inch in size grading, or it may be an ascending or descending fluidized bed of coke, sand, ceramic or other suitable inert particles of a size determined by the velocity of the gas used to fluidize the bed, the particle density and the degree of expansion of the bed required.

The temperature at which the moving bed is maintained depends on the degree of removal of non-aromatic hydrocarbons necessary to achieve a desired purity of the product. Provided that the desired purity is obtained, the temperature should be maintained as low as possible within the preferred range since the yield of purified benzole is higher at the lower temperatures. The temperature employed also depends on the pressure at which the process is operated. Thus, increased pressure and increased time of contact enables a given degree of purification of the benzole to be achieved at a lower temperature than would be necessary at atmospheric pressure.

The moving bed may be heated by any known means. For instance, it may be heated in a zone separate from the pyrolysis zone by the combustion of coke-oven gas or, if the bed consists of coke, by the combustion of part of this coke.

The gas used in the process of this invention may be hydrogen or a gas containing not less than about 30 percent of free hydrogen, for example, coke-oven gas. The gas may be mixed with steam, if desired, provided that the mixture contains not less than 30 percent of free hydrogen.

The benzole may be introduced into the moving bed with the gas and the gas may be used, if desired, under suitable conditions to fluidize the moving bed. The ratio moles hydrogen to moles benzole is preferred to be within the range of about 1.5 to about 3.0. Higher ratios tend to make the recovery of purified benzole more difficult due to the increased volume of gas while at ratios below about 1.5 the beneficial effect of the presence of hydrogen during the pyrolysis appreciably diminishes.

Example 1

A hydro-refined coke-oven benzole was injected into a fluidized bed of sand contained in a reaction vessel of 3 inches internal diameter and maintained at a temperature of 780° C., in the presence of hydrogen. The flow of hydrogen, which maintained the bed of sand in the fluidized condition was 700 litres/hr. and the benzole was fed at a rate of 845 grams/hr. The pressure was about atmospheric and the contact time about 2 seconds. The sand particles continuously withdrawn from the bottom of the reaction vessel were lifted by a stream of air through a combustion tube of 1½ inches internal diameter, where the particles were heated by the combustion of coke-oven gas, to a cyclone situated above the reaction vessel. The sand was separated from the flue gases in the cyclone and fed continuously under the influence of gravity to the top of the reaction vessel. The vaporized products of the process were cooled and the uncondensed gases and vapors passed through a washtower to remove residual benzole. The products liquid at ordinary temperatures were fractionally distilled and a benzene fraction, which included the fore-runnings, collected up to the end of the benzene flat in the distillation curve. In the table below, the benzene fraction from the untreated benzole was obtained under the same conditions as the benzene fraction from the product and the data are therefore directly comparable.

| | Feed | Product |
|---|---|---|
| Benzene fraction percent wt. of benzole fed | 65 | 62.2 |
| Crystallizing point of benzene fraction, ° C | 3.36 | 5.46 |

Example 2

A motor benzole was treated in the same apparatus and under the same conditions as in Example 1 except that the fluidized bed consisted of coke maintained at a temperature of 750° C. by the partial combustion of the coke in the combustion tube and that the feed rates were 820 litres of hydrogen/hr. and 700 grams of benzole/hr. The benzene fractions were obtained as in Example 1.

|  | Feed | Product |
|---|---|---|
| Benzene Fraction percent wt. of benzole fed | 72.5 | 63.5 |
| Crystallizing point of benzene fraction, ° C | 1.46 | 5.16 |

I claim:

1. A process for the recovery of benzene from benzole in a form substantially free from non-aromatic hydrocarbons and wherein the formation of condensed aromatic hydrocarbons is suppressed, which comprises introducing a benzole rich in benzene and containing non-aromatic hydrocarbons, and a gas containing free hydrogen in amounts such that the molar ratio of hydrogen to benzole is within the range of about 1.5:1 to about 3:1, said gas containing at least 30% hydrogen, into a moving body of inert material maintained at a temperature within the range of 650° to 900° C. and under a pressure which is between atmospheric and about 10 atmospheres and then cooling and separating benzene.

2. The process of claim 1 wherein said inert material is maintained at a temperature within the range of about 750° to 850° C.

3. The process of claim 1 wherein said benzole mixture comprises crude benzoles produced by the carbonization of coal at low to medium temperatures.

4. The process of claim 1 wherein said benzole mixture comprises hydro-refined benzole.

References Cited in the file of this patent

UNITED STATES PATENTS

| 2,561,420 | Schutte | July 24, 1951 |
| 2,597,346 | Leffer | May 20, 1952 |
| 2,690,990 | Adams et al. | Oct. 5, 1954 |
| 2,775,629 | Anderson | Dec. 25, 1956 |

FOREIGN PATENTS

| 569,035 | Great Britain | May 2, 1945 |

OTHER REFERENCES

American Chemical Society, Progress in Petroleum Technology, pp. 40, 54, and 56 (1951), vol. 5.